(12) United States Patent
Bauer et al.

(10) Patent No.: US 7,355,980 B2
(45) Date of Patent: Apr. 8, 2008

(54) COSTS IN DATA NETWORKS

(75) Inventors: Daniel Bauer, Birmensdorf (CH); John N. Daigle, Taylor, MS (US); Ilias Iliadis, Rueschlikon (CH); Paolo Scotton, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 10/432,453

(22) PCT Filed: Nov. 12, 2001

(86) PCT No.: PCT/IB01/02078

§ 371 (c)(1),
(2), (4) Date: Nov. 17, 2003

(87) PCT Pub. No.: WO02/43324

PCT Pub. Date: May 30, 2002

(65) Prior Publication Data

US 2004/0071089 A1    Apr. 15, 2004

(30) Foreign Application Priority Data

Nov. 21, 2000    (EP) .................................. 00811104

(51) Int. Cl.
*H04L 12/28*    (2006.01)

(52) U.S. Cl. ....................................................... 370/238
(58) Field of Classification Search ................ 370/238, 370/238.1, 248, 395, 395.21, 395.2
See application file for complete search history.

(56) References Cited

U.S. PATENT DOCUMENTS

| | | | |
|---|---|---|---|
| 5,754,543 A * | 5/1998 | Seid ............................ 370/351 |
| 6,088,436 A * | 7/2000 | Mashinsky ............. 379/210.01 |
| 6,195,553 B1 * | 2/2001 | Claffery et al. ............. 455/445 |
| 6,330,229 B1 * | 12/2001 | Jain et al. .................... 370/256 |
| 6,744,755 B2 * | 6/2004 | Ozluturk et al. ............ 370/342 |

* cited by examiner

Primary Examiner—Kwang Bin Yao
Assistant Examiner—Andrew Lai
(74) Attorney, Agent, or Firm—Douglas W. Cameron (57) ABSTRACT

A method for deriving a set of efficient path costs for a group of nodes comprising a source node and a plurality of destination nodes in a data communications networks, wherein the path costs for paths between nodes in the group are defined in the network and each path cost comprises a restrictive cost and an additive cost, comprises iteratively identifying the paths of higher bandwidth first and, when two or more paths of equal bandwidth are encountered, selecting the path having a lower transit delay associated therewith.

9 Claims, 7 Drawing Sheets

Transition Matrix

COSTS IN DATA NETWORKS

TECHNICAL FIELD

The present invention generally relates to costs in data communications networks and particularly relates to a method, apparatus, and computer program element for deriving a set of efficient path costs for a group of nodes of a data communications network.

DESCRIPTION OF PRIOR ART

Support of a Quality of Service (QoS) in the large scale networks such as the Internet is becoming increasingly important for heterogeneous applications. To ensure a QoS, paths for connecting end users have to satisfy given requirements. Routing decisions are therefore an important consideration in the provision of QoS guarantee. Therefore, the routing protocol should be aware of traffic characteristics supported by various links in the network.

QoS extensions have been proposed for well-known routing protocols such as the Open Shortest Path First (OSPF) protocol. Examples of such extensions are described in "*Implementation and Performance Measurements of QoS Routing Extensions to OSPF*", Apostolopoulos et al. Proceeding of IEEE INFOCOM'99, pp. 75-83, New York, March 1999. The OSPF protocol is example of a link state routing protocol. It is well recognized that such protocols do not operate efficiently in large networks. Thus, in the interests of scalability, an OSPF network is divided into several routing areas. The OSPF protocol is further described in "*OSPF Version 2*", Moy, Internet Engineering Task Force (IETF) Request for Comments (RFC) 2328, April 1998.

Another, similar routing protocol which is well-known in the art is the Private Network to Network Interface (PNNI) described in "*Private Network to Network Interface Specification, Version 1.0*", the ATM Forum, March 1996. According to the PNNI protocol, a network is divided into several clusters to form a routing hierarchy.

To provide globally accurate path selection, the traversing characteristics of each routing domain involved, be it an OSPF area, or a PNNI cluster, should be considered. "*On Scalable QoS Routing, Performance Evaluation of Topology Aggregation*", Hao et al, Proceedings of IEEE INFOCOM'2000, Tel Aviv, Israel, March 2000 and "*QoS Routing: a Precomputation Perspective*". Orda et al, Proceeding of IEEE INFOCOM'99 pp. 128-136, Tel Aviv, Israel, March 2000 both suggest that significant gains in path computation efficiency can be obtained via hierarchical organization of networks.

Described in "*Transition Matrix Generation for Complex Node Representation*", Iliadis et al, Proceedings of the IEEE ATM Workshop'99, pp 489-500, Kochi, Japan, May 1999 is a method of representing the traversing characteristics of a routing domain by a transition matrix giving the path cost for each pair of ingress-egress nodes of the domain. Each entry in a transition matrix is a minimal representation of the traversing characteristic of a corresponding pair of ingress-egress nodes. The traversing characteristics can be described in terms of restrictive cost metrics, additive cost metrics, or both. Transition characteristics described in terms of only one metric can be regarded as one dimensional. Transition characteristics described in termes of N metrics can be regarded as N dimensional. An additive metric of a path is the sum of all additive metrics of all links in a path. A restrictive metric of a path is the minimum of the restrictive metrics of all links in the path. Examples of additive metrics include delays and administrative costs. Examples of restive metrics include bandwidth. The minimal representation of the traversing characteristics has been referred to in the art to as the efficient frontier. Conventional techniques for computing efficient frontiers will be described shortly. It is possible to classify these techniques according to two criteria:

Computation result: Some techniques compute efficient frontiers from one source ingress-egress node to all the other ingress-egress nodes in the network. Other techniques compute efficient frontiers between all pairs of ingress-egress nodes. It will be appreciated that techniques belonging to the former category must be applied to all ingress-egress nodes.

Delay function: Some techniques support only fixed delay functions. Other techniques can be applied to both fixed and bandwidth-dependent delays.

The following three well-known algorithms may employed for computing the minimal representations:

The Multi-Dijkstra algorithm described. in "*Efficient Frontier Formulation for Additive and Restrictive Metrics in Hierarchical Routing*", Bauer et al, Proceedings of the IEEE ICC'00, pp. 1353-59, New Orleans, June 2000:

The Bellman-Ford algorithm described in "*Introduction to Algorithms*", Cormen et al. the MIT Electrical Engineering and Computer Science Series, MIT Press, ISBN 0-262-031412-8, 1989, in "On a Routing Problem", Bellman. Quarterly of Applied Mathematics, Vol. 16, No. 1, pp. 87-90, 1958, and in "Flows in Networks", Ford Jr. et al. Princeton University Press, 1962; and, The Floyd-Warshall algorithm described in "Algorithm 97 (Shortest Path)", Floyd, Communications of the ACM, Vol. 5, No. 6, 1965.

All three of these algorithms are applicable to constant delays. However, only the Bellman Ford and Floyd Warshall algorithms can handle bandwidth dependent delays. Also, only the Multi-Dijkstra and Bellman-Ford algorithms can solve the efficient frontier problem for one source to all nodes. The Multi-Dijkstra and Floyd-Warshall algorithms are generally less complex than the Bellman-Ford algorithm for computing efficient frontiers. A choice between these algorithms therefore should be based on application. For example, if there are only a few ingress-egress vertices, and only constant delays fall to be considered, then the Multi-Dijkstra algorithm is preferable to the Floyd-Warshall algorithm.

In general, conventional techniques for computing the efficient frontier from one node to all other nodes of a routing domain are computationally complex and limited in application. It would be desirable to provide a simpler method for computing such efficient frontiers. Additionally, it would be desirable to provide a method for solving the "One source to all nodes" problem.

In accordance with the present invention, there is now provided a method for deriving a set of efficient path costs for a group of nodes comprising a source node and a plurality of destination nodes in a data communications networks, wherein the path costs for paths between nodes in the group are defined in the network and each path cost comprises a restrictive cost and an additive cost, the method comprising:

SUMMARY OF THE INVENTION a) recording, in a first data set, the path costs for direct paths from the source node to any of the destination nodes, each recorded cost being associated in the first data set with the node reached by the corresponding path;

b) selecting the best path cost from the first data set, wherein the best path cost is determined as that comprising the best restrictive cost, or, if a plurality of the path costs comprise equal restrictive costs, the or a path cost having the best restrictive cost and the best additive cost;

c) recording the best path cost selected in step b) in a second data set, the recorded cost being associated in the second data set with the node reached by the corresponding path;

d) eliminating the cost recorded in step c) in the second data set from the first data set;

e) in the first data set, recording the cumulative path costs for direct paths from the destination node reached by the path corresponding to the cost recorded in step c) to any other node in the group, each recorded cumulative path cost being associated in the first data set with the node reached by the corresponding path;

f) for each node for which an associated cost was recorded in first data set in step e) comparing the costs associated with that node in the first and second data sets and eliminating from the first data set any such cost for reaching that node which has both a worse restrictive cost and a worse additive cost than any other such cost for reaching that node or any such cost for reaching that node which has an equal restrictive and a worse additive cost than any other such cost for reaching that node; and g) repeating steps b) to f) until no costs remain in the first data set after step f);

whereby the resulting second data set comprises the set of efficient costs.

This advantageously provides a much simpler and faster method for computing efficient frontiers. In addition, the method facilitates solution of the "One source to all nodes" problem. Furthermore, the method is applicable to both constant and bandwidth dependent delays.

Each restrictive cost preferably comprises a value indicative of bandwidth of the corresponding path; and the best restrictive cost is the cost indicative of the maximum bandwidth. Each additive cost preferably comprises a value indicative of transit delay associated with the corresponding path and the best additive cost is the cost indicative of the minimum transit delay. At least one of the paths may comprise a plurality of links and at least one intermediate node.

The present invention also extends to a computer program element comprising computer program code means which, when loaded in a processor of a data processing system, configures the processor to perform the method for deriving a set of efficient path costs as hereinbefore described.

Viewing the present invention from another aspect, there is now provided apparatus for deriving a set of efficient path costs for a group of nodes comprising a source node and a plurality of destination nodes in a data communications networks, wherein the path costs for paths between nodes in the group are defined in the network and each path cost comprises a restrictive cost and an additive cost, the apparatus comprising memory for storing first and second data sets of the path costs and control logic configured to:

a) record, in the first data set, the path costs for direct paths from the source node to any of the destination nodes, each recorded cost being associated in the first data set with the node reached by the corresponding path;

b) select the best path cost from the first data set, wherein the best path cost is determined as that comprising the best restrictive cost, or, if a plurality of the path costs comprise equal restrictive costs, the or a path cost having the best restrictive cost and the best additive cost;

c) record the best path cost selected in step b) in the second data set, the recorded cost being associated in the second data set with the node reached by the corresponding path;

d) eliminate the cost recorded in step c) in the second data set from the first data set;

e) in the first data set, record the cumulative path costs for direct paths from the destination node reached by the path corresponding to the cost recorded in step c) to any other node in the group, each recorded cumulative path cost being associated in the first data set with the node reached by the corresponding path;

f) for each node for which an associated cost was recorded in first data set in step e) compare the costs associated with that node in the first and second data sets and eliminating from the first data set any such cost for reaching that node which has both a worse restrictive cost and a worse additive cost than any other such cost for reaching that node or any such cost for reaching that node which has an equal restrictive and a worse additive cost than any other such cost for reaching that node; and, g) repeat steps b) to f) until no costs remain in the first data set after step f);

whereby the resulting second data set comprises the set of efficient costs.

The present invention extends to a data networking device comprising a plurality of ports each for connection to a path of a data communications network, and apparatus for deriving a set of efficient path costs as hereinbefore described. The present invention further extends to a data network comprising a plurality of nodes interconnected by plurality of paths, at least one of the nodes comprising such a data networking device.

BRIEF DESCRIPTION OF THE DRAWINGS

Preferred embodiments of the present invention will now be described, by way of example only, with reference to the accompanying drawings, in which.

Before continuing further, relevant terms and expression are defined and explained.

The expression "restrictive cost" is herein used to describe cost as a function of a dimension or characteristic of a link, such as the bandwidth, for example. The restrictive cost C can, for example, be defined as C=Max−bandwidth, or as C=1/bandwidth, for example. According to the definition of restrictive cost, the weakest link of a path defines the cost. The opposite of restrictive costs are additive costs. Additive costs depend, for example, on the delay of links.

The words "node" or "vertex" are herein used as generic terms for routers, switches, bridges, brouters, hubs, and any other data networking device that transmits or receives information in a communications network.

DETAILED DESCRIPTION OF THE INVENTION

A network can be modeled by a directed graph. The following conventions will be used:
  A node of the network will be referred to as a vertex of the graph
  A link between two network nodes will be referred to as a direct path or edge between two vertices of the graph.

Let G(V, E) be the directed graph representing the network at a given point in time. V is a set of vertices and E a set of directed edges. Therefore, for all $v_i$, $v_j \in V$ if $v_i$ and $v_j$ are connected, the edge $$v_i \xrightarrow{\varepsilon_{v_i,v_j}} v_j \in E$$

exists. Vertices may be connected by multiple parallel edges. A set of edges connecting two vertices $v_i$ and $v_j$ will be denoted as $$E_{v_i,v_j} \triangleq \{\varepsilon^0_{v_i,v_j}, \varepsilon^1_{v_i,v_j}, \ldots, \varepsilon^n_{v_i,v_j}\}.$$

The notation $\epsilon_{v_i,v_j}$ refers to an arbitrary edge connecting vertices $v_i$ and $v_j$.

Let s and t be two vertices of graph G(V, E). Let $P_{s,t}$ be the set of paths $$s \xrightarrow{P_{s,t}} t$$

that connect s to t. If no path exists from s to t, then $P_{s,t}=\emptyset$. A path $\rho \in P_{s,t}$ of length $\|\rho\|=n$ is a sequence $\{\epsilon_{v_0,v_1}, \epsilon_{v_1,v_2}, \ldots, \epsilon_{v_{n-1},v_n}\}$ of n edges such that $v_0=s$ $v_n=t$ $\epsilon_{v_i,v_{i+1}} \in E_{v_i,v_{i+1}} \forall i \in [0, \ldots, n-1]$.

A vertex v is said to be part of a path $\rho$, if an edge $\epsilon_{v_i,v_{i+1}} \in \rho$ exists with either $v=v_i$ or $v=v_{i+1}$.

Metrics on paths and edges provide information about available resources in the network. Metrics for available bandwidth and transit delay will now be defined. However, it will be appreciated that observations presented herein are applicable to any restrictive and additive metric that fits the definitions provided herein.

For an edge $\epsilon_{v_i,v_j} \in E$, available bandwidth will be denoted by $B(\epsilon_{v_i,v_j}) \in \mathbb{R}^+$. Available bandwidth is said to be restrictive because the available bandwidth of a path is the minimum of the available bandwidth of edges traversed by the path. For a feasible path $\rho$ from s to t of length n, $\rho \in P_{s,t}$, the available bandwidth is $$B(\rho) = \min_{\varepsilon \in \rho} \{B(\varepsilon)\} \quad (1)$$

Assume that the transit delay of an edge is a function of the requested bandwidth b. Thus, for an edge $\epsilon \in E$ and a requested bandwidth b, the transit delay is given by $D(\epsilon,b) \in \mathbb{R}^+$. If $b>B(\epsilon)$, then $D(\epsilon,b)=\infty$. Transit delay is said to be additive because the transit delay of a path is the sum of the transit delays of the traversed edges. For a feasible path from s to t of length n, $\rho \in P_{s,t}$, the transit delay is $$D(\rho, b) = \sum_{\varepsilon \in \rho} D(\varepsilon, b) \quad (2)$$

If, for an edge $\epsilon \in \rho$, the requested bandwidth $b>B(\epsilon)$, then $D(\rho,b)=\infty$. Otherwise, $D(\rho,b)$ is finite.

In the following, two dimensional transition characteristics for a pair of ingress-egress vertices are defined. The dimensions of the transition characteristics are bandwidth and delay. The extension to a set of ingress egress vertices is then examined.

Consider the aforementioned graph G(V<E) representing a routing domain. Let $s,t \in V$ be two ingress-egress vertices. The traversing metrics from s to t of interest for taking a routing decision are maximum available bandwidth, $B^{max}$, and the minimum transit delay function $D^{eff}(b)$ for a requested bandwidth b. Both of those depend on a set of paths $p_{s,t}$ connecting s to t. In particular, $$B^{max}_{s,t} \triangleq \max_{\rho \in P_{s,t}} (B(\rho)), \text{ and} \quad (3)$$

$$D^{eff}_{s,t}(b) \triangleq \max_{\rho \in P_{s,t}} \{D(\rho, b)\}. \quad (4)$$

From the definitions of available bandwidth and transit delay, it follows that $$D^{eff}_{s,t}(b) < \infty$$

for $$b \leq B^{max}_{s,t}$$

and $$D^{eff}_{s,t}(b) = \infty$$

for $$b > B_{s,t}^{max}.$$

Therefore, $$D_{s,t}^{eff}$$

is sufficient to describe the traversing metrics of the ingress-egress pair s,t because $$D_{s,t}^{eff}$$

represents the path with the minimum delay for every bandwidth.

$$D_{s,t}^{eff}$$

also defines the efficient frontier for available bandwidth and transit delay from s to t. By definition, $$D_{s,t}^{eff}$$

depends on the set of paths $P_{s,t}$. However, only a subset of $P_{s,t}$ contributes to the efficient frontier. This set is hereinafter referred to as efficient paths for s and t or $$P_{s,t}^E$$

$$P_{s,t}^E \triangleq \{\rho \in P_{s,t} \mid \exists b : D(\rho, b) < \infty \land D(\rho, b) = D_{s,t}^{eff}(b)\} \quad (5)$$

The efficient frontier can be regarded as a series of segments, where each segment corresponds to the transmit delay function of a path $$D_{s,t}^{eff}(b) = \begin{cases} D(\rho_1, b) \forall\ b \in (b_0, b_1) \\ D(\rho_2, b) \forall\ b \in (b_1, b_2) \\ \vdots \\ D(\rho_n, b) \forall\ b \in (b_{n-1}, b_n) \\ \infty \forall\ b > b_n \end{cases} \quad (6)$$

Where $$b_n = B_{s,t}^{max},$$

$b_0 = 0$ and $\rho_i$ with $i \in [1,n]$ is given as:

$$\rho_i \in P_{s,t}^E \text{ such that } D(\rho_i, b) = D_{s,t}^{eff}(b) \forall\ b \in [b_{i-1}, b_i]. \quad (7)$$

Note that $\rho_i$ may not be unique in that there may exist multiple paths satisfying equation (7). Also, for some forms of delay functions, it may occur that a single path contributes to multiple segments. For example, it is possible $\rho_i = \rho_j$ for some $i \neq j$ in equation (6).

Figure 1:
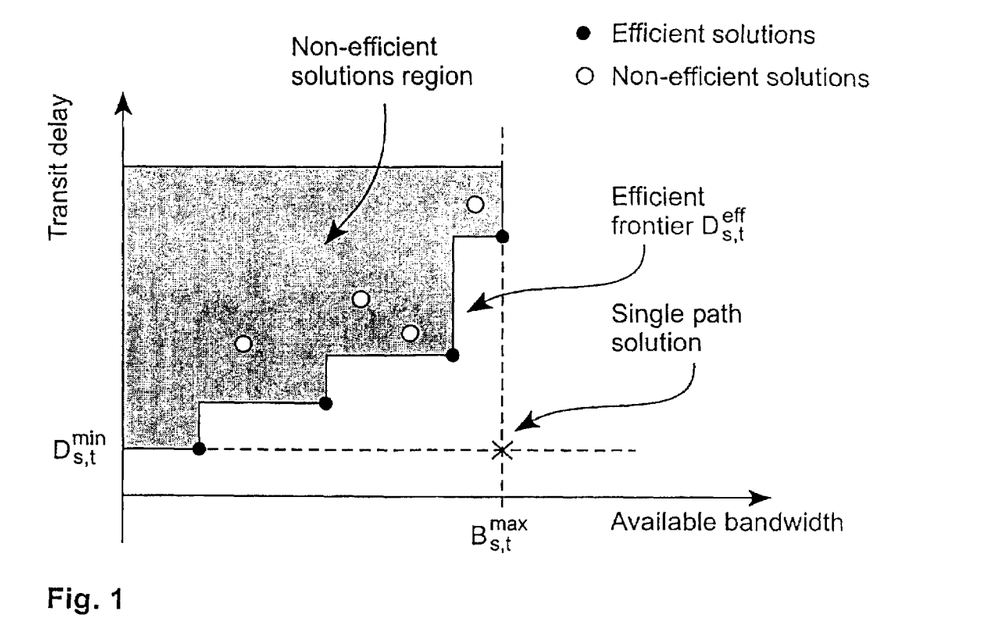
FIG. 1 is graph illustrating an example of an efficient frontier for constant delay paths.

Referring now to FIG. 1, illustrated therein is an example of an efficient frontier for constant delay paths. These are paths for which $D(\rho, b)$ is independent of b and thus can be written $D(\rho)$. In this example, $$P_{s,t}^E$$

consists of four paths. The transit delay-bandwidth characteristics of these paths are shown as black dots on the efficient frontier. The available bandwidth and the transit delay of these efficient paths completely define $$D_{s,t}^{eff}.$$

The shaded area also contains non-efficient solutions that are not part of $$P_{s,t}^E$$

shown as white dots. For constant delay paths, it is possible to define the achievable minimum delay as $$D_{s,t}^{min} = \min_{\rho \in P_{s,t}^E} \{D(\rho)\} \quad (8)$$

In the general case, it may not be possible to achieve $$D_{s,t}^{min}$$

for a requested bandwidth $$B_{s,t}^{max}.$$

This is only possible if the delays $D(\rho)$ of the paths $$\rho \in P_{s,t}^E$$

are all identical. For example, this is the case if $$P_{s,t}^E$$

contains only as a single path. Therefore, for any network, if $$D_{s,t}^{eff}(B_{s,t}^{max}) = D_{s,t}^{min},$$

then there exists a "single path solution".

Suppose now that the graph contains N ingress-egress vertices called $R_0 \ldots, R_{N-1} \in V$. For each pair of ingress-egress vertices $R_i, R_j$, an efficient frontier $$D_{R_i,R_j}^{eff}(b)$$

exists. The set of all efficient frontiers completely defines the traversing metrics of the network. The algebraic representation of all efficient frontiers between any pair of ingress-egress vertices is given in a matrix called the transition matrix. The transition matrix may be specified as follows:

$$M = \begin{Bmatrix} - & D_{R_0,R_1}^{eff}(b) & \cdots & D_{R_0,R_{N-1}}^{eff}(b) \\ D_{R_1,R_0}^{eff}(b) & - & \cdots & D_{R_1,R_{N-1}}^{eff}(b) \\ \vdots & \vdots & \ddots & \vdots \\ D_{R_{N-1},R_0}^{eff}(b) & D_{R_{N-1},R_1}^{eff}(b) & \cdots & - \end{Bmatrix} \quad (9)$$

The transition matrix is an algebraic representation of the topology of the underlying routing domain. It is an exact representation of the routing domain in the sense that it completely preserves the traversing characteristics regarding bandwidth and delay metrics.

Figure 2A:
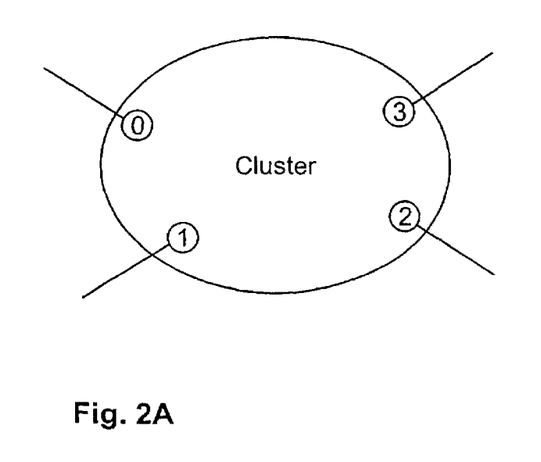
FIG. 2a is a simplified view of an example network having four ingress-egress nodes.
Figure 2B:
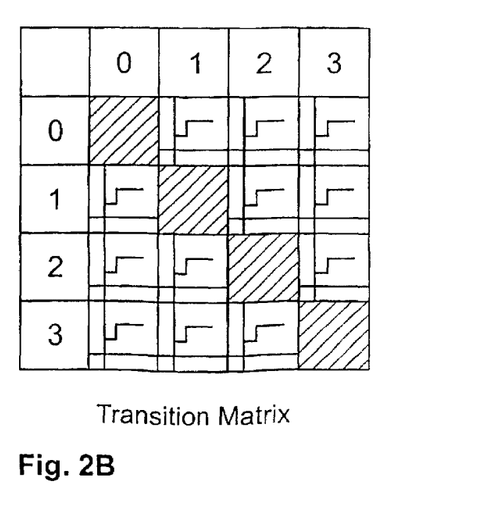
FIG. 2b is a graphical illustration of a transition matrix corresponding to the cluster network.

As indicated earlier, a problem addressed by the present invention concerns computation of a transition matrix. This problem specifically involves the computation of each entry of the transition matrix. With reference to FIG. 2a, consider an example network comprising four ingress-egress vertices 0, 1, 2, and 3. Referring to FIG. 2b, each entry is an efficient frontier between each pair of ingress-egress vertices.

In a preferred embodiment of the present invention, the efficient frontiers corresponding to various vertices are determined iteratively in parallel and in a "descending" manner. By "descending" what is meant is that the points of the efficient frontier with larger bandwidths are found first, and, among the points with equal bandwidths, the points with smaller delays are found first. Considering a graphical representation of an efficient frontier, with delay along the y axis and bandwidth along the x axis as hereinbefore described, this can approach effectively sweeps out the efficient frontier from right (higher bandwidth) to left (lower bandwidth). A preferred example of a process for determining efficient frontiers in accordance with the present invention will be described in detail shortly. However, some preliminary definitions are provided beforehand.

Preliminary Definitions

Let G(V, E) be the graph representing the network at a given point in time. V is a set of vertices and E a set of directed edges. Therefore, for all $v_i, v_j \in V$ if $v_i$ and $v_j$ are connected, the edge $$v_i \xrightarrow{\varepsilon_{v_i,v_j}} v_j \in E$$

exists. Vertices may be connected by multiple parallel edges. The set of edges connecting two vertices $v_i$ and $v_j$ will be denoted as $$E_{v_i,v_j} \triangleq \{\varepsilon_{v_i,v_j}^0, \varepsilon_{v_i,v_j}^1, \ldots, \varepsilon_{v_i,v_j}^n\}.$$

The notation $\varepsilon_{v_i,v_j}$ refers to arbitrary edge connecting vertices $v_i$ and $v_j$. For an edge $\varepsilon_{v_i,v_j} \in E$, it metric (cost) in terms of bandwidth and delay will be denoted by $C(\varepsilon_{v_i,v_j}) \triangleq (B(\varepsilon_{v_i,v_j}), D(\varepsilon_{v_i,v_j}))$, where $B(\varepsilon_{v_i,v_j})$ and $D(\varepsilon_{v_i,v_j})$ denote the available bandwidth and delay associated with the edge, respectively. It is assumed that these metrics are real non-negative numbers. In other words, $B(\varepsilon_{v_i,v_j}) \in \mathbb{R}^+$ and $D(\varepsilon_{v_i,v_j}) \in \mathbb{R}^+$.

Two costs $C_i = (B_i, D_i)$ and $C_j = (B_j, D_j)$ are compared as follows:

Cost $C_i$ is equal to $C_j$ ($C_i = C_j$) if and only if $B_i = B_j$ and $D_i = D_j$. Otherwise, cost $C_i$ is not equal to $C_j$ ($C_i \neq C_j$).

Cost $C_i$ is better than $C_j$ or, equivalently, cost $C_j$ is worse than cost $C_i$, if and only if $B_i \geq B_j$, $D_i \leq D_j$, and ($C_i \neq C_j$).

Cost $C_k$ extends costs $C_i$ and $C_j$ ($C_k = \text{ext}(C_i, C_j)$), if and only if $B_k = \min(B_i, B_j)$ and $D_k = D_i + D_j$.

Process

Let $v_0$ be the source vertex from which efficient frontiers are to be computed. Let $r_i$, $i=1 \ldots N-1$, be the list of costs to reach vertex $v_i$ from $v_0$. Let $f_i$, $i=1 \ldots N-1$, be the efficient frontier associated with vertex $v_i$. Let $\Re$ and $\Im$ be data sets containing the corresponding lists, i.e. $\Re = \{r_1, \ldots, r_{N-1}\}$ and $\Im = \{f_i, \ldots, f_{N-1}\}$, respectively. These data sets may for example be arranged as. tables Before continuing further, the following additional definitions are provided:

i is the iteration counter;

$v_{m(i)}$ is the tagged vertex of the $i^{th}$ iteration;

$E_{v_j}$ is the set of outgoing edges from vertex $v_j$;

$r_j$ is the list of cost to reach vertex $v_j$ from $v_0$;

$f_j$ is the list comprising the efficient frontiers corresponding to vertex $v_j$;

What follows now is a pseudo code representation of the process in the form of a series of Rules, 1) to 3).

Initialization:
  i=1
  m(1)=0
  $f_0=(\infty,0)$
  $\Re=\emptyset$
  $\Im=\emptyset$ Step $i^{th}$ iteration:

1) for each edge $\varepsilon_{v_{m(i)},v_j}$ in the set $E_{v_{m(i)}}$ do
  a) calculate the cost $C_j=(B_j,D_j)$ of the extended path $$v_0 \rightsquigarrow v_{m(i)} \xrightarrow{\varepsilon_{v_{m(i)},v_j}} v_j$$

based on the last entry of the $f_{m(i)}$ list and the cost $C(\varepsilon_{v_{m(i)},v_j})$, i.e. $C_j = \text{ext}(f_{m(i)}, C(\varepsilon_{v_{m(i)},v_j}))$.

b) if $C_j$ is equal or worse than any entry of list $f_j$, then discard $C_j$,   c) else if $C_j$ is equal or worse than any entry of list $r_j$, then discard $C_j$,
    else do   d) enter $C_j$ in list $r_j$ by keeping the list sorted according to the bandwidth, and delay (for equal bandwidth entries).

e) discard any entries of list $r_j$ which are worse than $C_j$.
    done 2) if ℜdata set is empty, then STOP.

3) else do
   a) choose the best entry of ℜdata set, say contained in the list $r_k$. The best entry may be considered to be the one with the largest bandwidth, and, in the case of multiple entries, with the lowest delay. Remaining ties are broken according to another criterion, such as hop count, for example, or arbitrarily.
   b) remove the entry from the list $r_k$ and place it in the list $f_k$.
   c) increase counter: i=i+1.
   d) set m(i)=k (so that $v_{m(i)}=v_k$)
   done Go back to Step.

EXAMPLE

Figure 3:
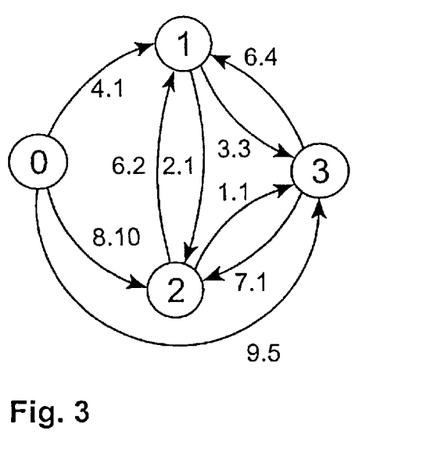
FIGS. 3 to 13 are directed graphs corresponding to the network.

Referring to FIG. 3, an example of a method embodying the present invention for determining the efficient frontiers from vertex 0 to remaining vertices 1, 2, and 3 of an example four node network will now be described. It will be appreciated that the present invention is equally to applicable to networks having more than or fewer than four nodes.

Step 1

Figure 4:
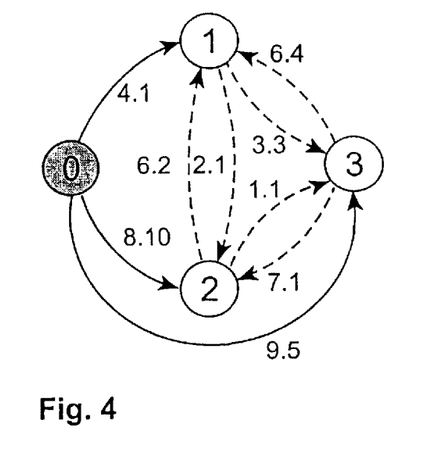

Referring now to FIG. 4, the method starts from vertex 0 and considers all outgoing edges from vertex 0. Three edges provide connectivity to vertices 1, 2, and 3 respectively. There is no current cost associated with vertex 0. The costs of the corresponding edges to vertices 1, 2, and 3 are therefore inserted in the ℜdata set according to Rule 1d) above.

$$\Re = \begin{Bmatrix} r_1 & r_2 & r_3 \\ 4,1 & 8,10 & 9,5 \end{Bmatrix}$$

In the ℜdata set, the best cost in terms of bandwidth is to vertex 3:9,5. This cost is then moved from the ℜdata set to the efficient frontier for vertex 3, according to rule 3b).

$$\Re = \begin{Bmatrix} r_1 & r_2 & r_3 \\ 4,1 & 8,10 & - \end{Bmatrix} \quad \Im = \begin{Bmatrix} f_1 & f_2 & f_3 \\ - & - & 9,5 \end{Bmatrix}$$

The process now moves to vertex 3 with an associated cost of 9,5.

Figure 5:
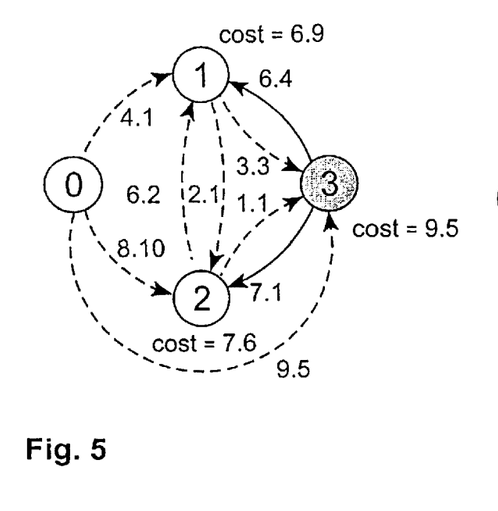

Step 2:

Referring now to FIG. 5, vertex 3 has two edges to vertices 1 and 2. The costs of these edges extended by the cost associated with vertex 3 (9,5) set in the ℑdata set are shown in FIG. 5. These costs are entered in the ℜdata set because there are still no entries for vertices 1 and 2 in the ℑdata set.

$$\Re = \begin{Bmatrix} r_1 & r_2 & r_3 \\ 4,1 & 8,10 & - \\ 6,9 & 7,6 & - \end{Bmatrix}$$

The widest bandwidth value corresponds to vertex 2:8,10. This value is moved from the ℜdata set to the efficient frontier of vertex 2.

$$\Re = \begin{Bmatrix} r_1 & r_2 & r_3 \\ 4,1 & - & - \\ 6,9 & 7,6 & - \end{Bmatrix} \quad \Im = \begin{Bmatrix} f_1 & f_2 & f_3 \\ - & - & 9,5 \\ - & 8,10 & - \end{Bmatrix}$$

The process now moves to vertex 2 with an associated cost of 8,10.

Figure 6:
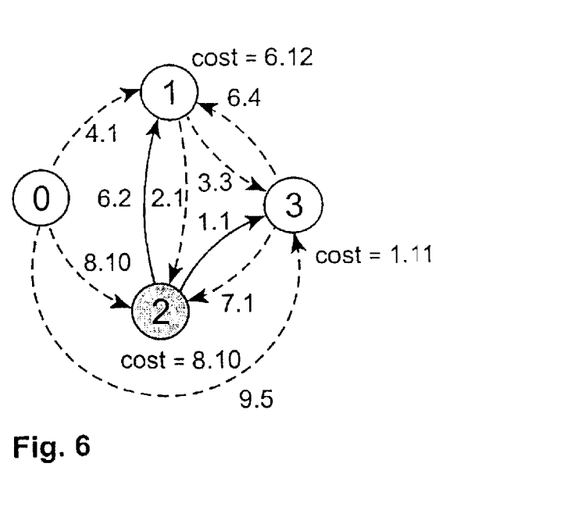

Step 3:

Referring now to FIG. 6, vertex 2 has two edges to vertices 1 and 3. The costs of these edges extended by the cost associated with vertex 2 (8,10) set in the ℑdata set are shown in FIG. 6. The cost to reach vertex 1 is equal to (6,12) which is worse than the cost (6,9) in the $r_1$ list, Therefore, according to Rule 1c), it is discarded. The cost to reach vertex 3 is equal to (1,11) which is worse than the cost (9,5) in the $f_3$ list. Therefore, according to Rule 1b), it is discarded. The widest bandwidth value corresponds to vertex 2:7,6.

$$\Re = \begin{Bmatrix} r_1 & r_2 & r_3 \\ 4,1 & - & - \\ 6,9 & 7,6 & - \end{Bmatrix}$$

This value is moved from the ℜdata set to the efficient frontier of vertex 2.

$$\Re = \begin{Bmatrix} r_1 & r_2 & r_3 \\ 4,1 & - & - \\ 6,9 & - & - \\ - & - & - \end{Bmatrix} \quad \Im = \begin{Bmatrix} f_1 & f_2 & f_3 \\ - & - & 9,5 \\ - & 8,10 & - \\ - & 7,6 & - \end{Bmatrix}$$

The method proceeds to vertex 2 with an associated cost of 7,6

Figure 7:
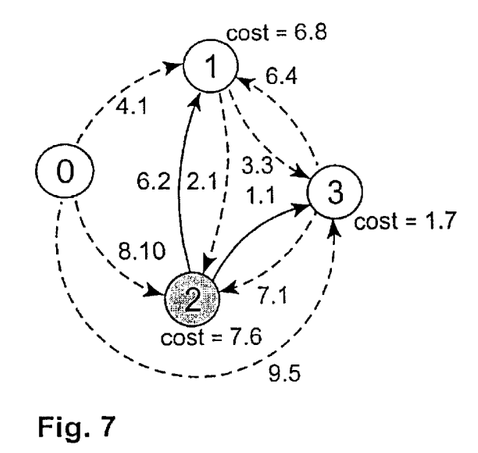

Step 4:

Referring to FIG. 7, vertex 2 has two edges to vertices 1 and 3. The costs of these edges extended by the cost associated with vertex 2 (7,6) set in the ℑdata set are shown in FIG. 7. The cost to reach vertex 1 is equal to (6,8) which is not equal to or worse than any entry of $r_1$. It is, therefore, entered into the ℜdata set according to Rule 1d). Entry (6,9), however, is worse than (6,8). Therefore, it is discarded according to Rule 1e). The cost to reach vertex 3 is equal to (1,7) which is worse than the cost (9,5) in the $f_3$ list. Therefore, according to Rule 1b) it is discarded.

$$\Re = \begin{Bmatrix} r_1 & r_2 & r_3 \\ 4,1 & - & - \\ 6,8 & - & - \end{Bmatrix}$$

The widest bandwidth value corresponds to vertex 1 6,8. This value is moved from the ℜdata set to the efficient frontier of vertex 1.

$$\mathfrak{R} = \begin{Bmatrix} r_1 & r_2 & r_3 \\ 4,1 & - & - \\ - & - & - \\ - & - & - \\ - & - & - \end{Bmatrix} \quad \mathfrak{I} = \begin{Bmatrix} f_1 & f_2 & f_3 \\ - & - & 9,5 \\ - & 8,10 & - \\ - & 7,6 & - \\ 6,8 & - & - \end{Bmatrix}$$

The method now proceeds to vertex 1 with an associated cost of 6,8

Step 5

Figure 8:
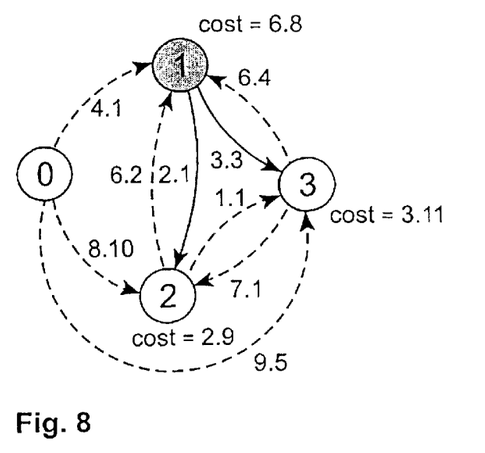

Referring now to FIG. 8, vertex 1 has two edges to vertices 2 and 3. The cost to reach vertex 2 is equal to (2,9) which is worse than the cost (7,6) in the $f_2$ list. Therefore, according to Rule 1b), it is discarded. The cost to reach vertex 3 is equal to (3,11) which is worse than the cost (9,5) in the $f_3$ list. Therefore, according to Rule 1b) it is discarded.

$$\mathfrak{R} = \begin{Bmatrix} r_1 & r_2 & r_3 \\ 4,1 & - & - \end{Bmatrix}$$

The widest bandwidth value corresponds to vertex 1. This value is moved from the $\mathfrak{R}$data set to the efficient frontier of vertex 1.

$$\mathfrak{R} = \begin{Bmatrix} r_1 & r_2 & r_3 \\ - & - & - \\ - & - & - \\ - & - & - \\ - & - & - \\ - & - & - \end{Bmatrix} \quad \mathfrak{I} = \begin{Bmatrix} f_1 & f_2 & f_3 \\ - & - & 9,5 \\ - & 8,10 & - \\ - & 7,6 & - \\ 6,8 & - & - \\ 4,1 & - & - \end{Bmatrix}$$

The process now proceeds to vertex 1 with an associated cost of 4,1,.

Figure 9:
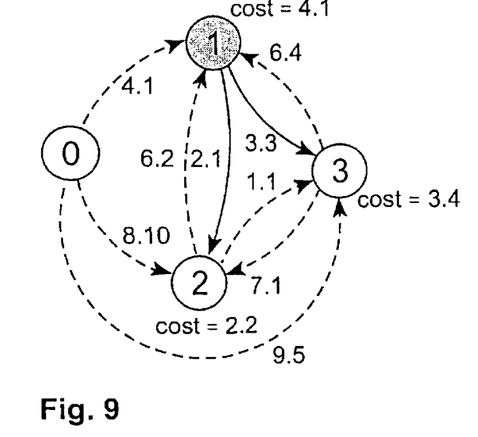

Step 6:

Referring to FIG. 9, vertex 1 has two edges to vertices 2 and 3. The cost to reach vertex 2 is equal to (2,2) which is not equal or worse than any entry of $f_2$. It is, therefore, entered in the $\mathfrak{R}$data set according to Rule 1d). The cost to reach vertex 3 is equal to (3,4) which is not equal or worse than any entry of $f_3$. It is therefore entered in the $\mathfrak{R}$data set according to Rule 1d).

$$\mathfrak{R} = \begin{Bmatrix} r_1 & r_2 & r_3 \\ - & 2,2 & 3,4 \end{Bmatrix}$$

The widest bandwidth value corresponds to vertex 3:3,4. This value is moved from the $\mathfrak{R}$data set to the efficient frontier.

$$\mathfrak{R} = \begin{Bmatrix} r_1 & r_2 & r_3 \\ - & - & - \\ - & - & - \\ - & - & - \\ - & - & - \\ - & - & - \\ - & 2,2 & - \end{Bmatrix} \quad \mathfrak{I} = \begin{Bmatrix} f_1 & f_2 & f_3 \\ - & - & 9,5 \\ - & 8,10 & - \\ - & 7,6 & - \\ 6,8 & - & - \\ 4,1 & - & - \\ - & - & 3,4 \end{Bmatrix}$$

The method now proceeds to vertex 3 with an associated cost of 3,4.

Figure 10:
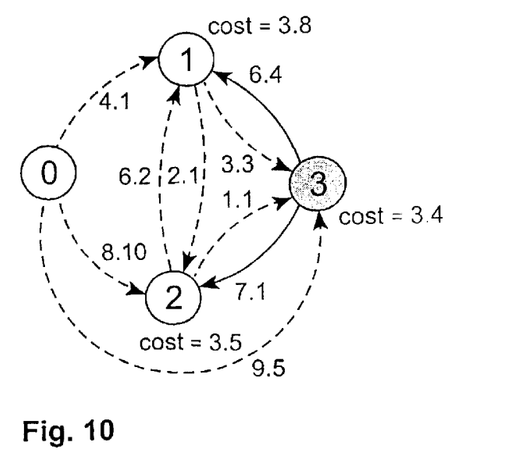

Step 7:

Referring now to FIG. 10, vertex 3 has two edges to vertices 1 and 2. The cost to reach vertex 1 is equal to (3,8) which is worse than the cost (4,1) in the $f_1$ list. Therefore, according to Rule 1b), it is discarded. However, the cost to reach vertex 2 is equal to (3,5) which is not equal to or worse than any entry of $f_2$ or $r_2$. It is therefore entered in the $\mathfrak{R}$data set according to Rule 1d).

$$\mathfrak{R} = \begin{Bmatrix} r_1 & r_2 & r_3 \\ - & 2,2 & - \\ - & 3,5 & - \end{Bmatrix}$$

The widest bandwidth value corresponds to vertex 2:3,5. This value is moved from the $\mathfrak{R}$data set to the efficient frontier of vertex 2.

$$\mathfrak{R} = \begin{Bmatrix} r_1 & r_2 & r_3 \\ - & - & - \\ - & - & - \\ - & - & - \\ - & - & - \\ - & 2,2 & - \\ - & - & - \end{Bmatrix} \quad \mathfrak{I} = \begin{Bmatrix} f_1 & f_2 & f_3 \\ - & - & 9,5 \\ - & 8,10 & - \\ - & 7,6 & - \\ 6,8 & - & - \\ 4,1 & - & - \\ - & - & 3,4 \\ - & 3,5 & - \end{Bmatrix}$$

The method now proceeds to vertex 2 with an associated cost of 3,5.

Figure 11:
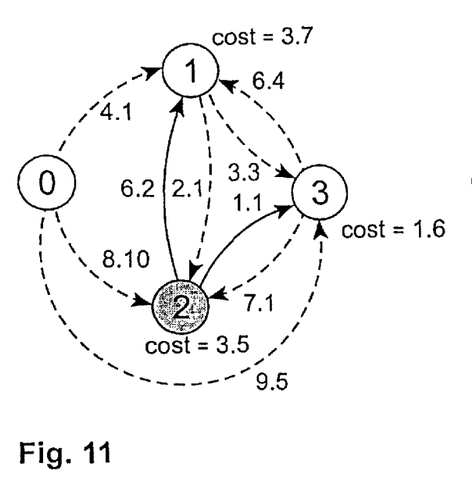

Step 8:

Referring to FIG. 11, vertex 2 has two edges to vertices 1 and 2. The cost to reach vertex 1 is equal to (3,7) which is worse than the cost (4,1) in the $f_1$ list. Therefore, according to Rule 1b), it is discarded. The cost to reach vertex 3 is equal to (1,6) which is worse than the cost (3,4) in the $f_3$ list. Therefore, according to Rule 1b), it is discarded.

$$\mathfrak{R} = \begin{Bmatrix} r_1 & r_2 & r_3 \\ - & 2,2 & - \end{Bmatrix}$$

The widest bandwidth value corresponds to vertex 2: 2,2. This value is moved from the $\mathfrak{R}$data set to the efficient frontier of vertex 2.

$$\Re = \left\{ \begin{array}{ccc} r_1 & r_2 & r_3 \\ - & - & - \\ - & - & - \\ - & - & - \\ - & - & - \\ - & - & - \\ - & - & - \\ - & - & - \\ - & - & - \end{array} \right\} \quad \Im = \left\{ \begin{array}{ccc} f_1 & f_2 & f_3 \\ - & - & 9,5 \\ - & 8,10 & - \\ - & 7,6 & - \\ 6,8 & - & - \\ 4,1 & - & - \\ - & - & 3,4 \\ - & 3,5 & - \\ - & 2,2 & - \end{array} \right\}$$

The method proceeds now to vertex 2 with associated cost of 2,2.

Figure 12:
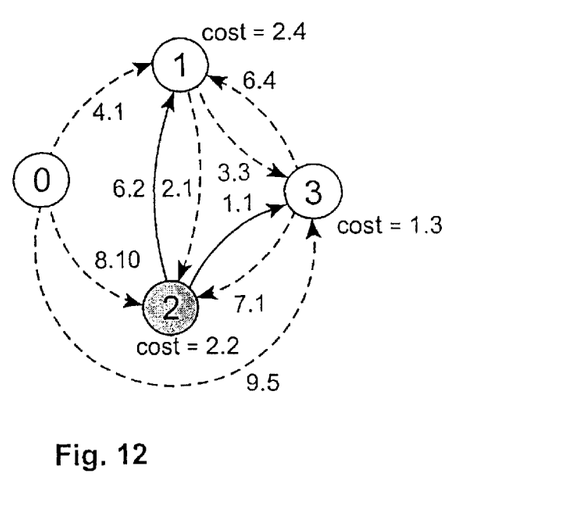

Step 9:

Referring now to FIG. 12, vertex 2 has two edges to vertices 1 and 3. The cost to reach vertex 1 is equal to (2,4) which is worse than the cost (4,1) in the $f_1$ list. Therefore, according to Rule 1b), it is discarded. However, the cost to reach vertex 3 is equal to (1,3) which is not equal to or worse than any entry in the $f_3$ list. It is therefore entered in the $\Re$ data set in accordance with Rule 1d).

$$\Re = \left\{ \begin{array}{ccc} r_1 & r_2 & r_3 \\ - & - & 1,3 \end{array} \right\}$$

The widest bandwidth value corresponds to vertex 3:1,3. This value is moved from the $\Re$ data set to the efficient frontier of vertex 3.

$$\Re = \left\{ \begin{array}{ccc} r_1 & r_2 & r_3 \\ - & - & - \\ - & - & - \\ - & - & - \\ - & - & - \\ - & - & - \\ - & - & - \\ - & - & - \\ - & - & - \\ - & - & - \end{array} \right\} \quad \Im = \left\{ \begin{array}{ccc} f_1 & f_2 & f_3 \\ - & - & 9,5 \\ - & 8,10 & - \\ - & 7,6 & - \\ 6,8 & - & - \\ 4,1 & - & - \\ - & - & 3,4 \\ - & 3,5 & - \\ - & 2,2 & - \\ - & - & 1,3 \end{array} \right\}$$

The method proceeds to vertex 3 with an associated cost of 1,3.

Figure 13:
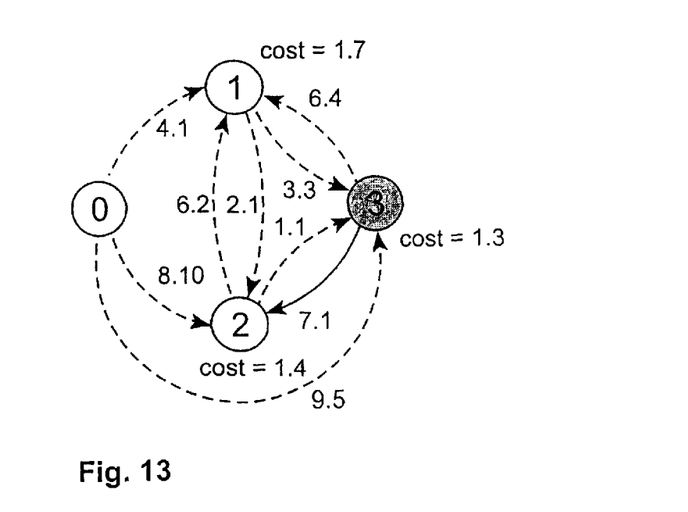

Step 10:

Referring now to FIG. 13, vertex 3. Has two edges 1 and 2. The cost to reach vertex 1 is equal to (1,7) which is worse than the cost (4,1) in the $f_1$ list. Therefore, according to Rule 1b), it is discarded. The cost to reach vertex 2 is equal to (1,4) which is worse than the cost (2,2) in the $f_2$ list. Consequently, according to Rule 1b), it is discarded.

$$\Re = \left\{ \begin{array}{ccc} r_1 & r_2 & r_3 \\ - & - & - \end{array} \right\}$$

As there are no more entries left in the $\Re$ data set, the process finishes according to Rule 2).

Final Result:

The efficient frontiers from vertex 0 to vertices 1, 2, 3 are as follows:

$$\Im = \left\{ \begin{array}{ccc} f_1 & f_2 & f_3 \\ 6,8 & 8,10 & 9,5 \\ 4,1 & 7,6 & 3,4 \\ - & 3,5 & 1,3 \\ - & 2,2 & - \end{array} \right\}$$

Figure 14:
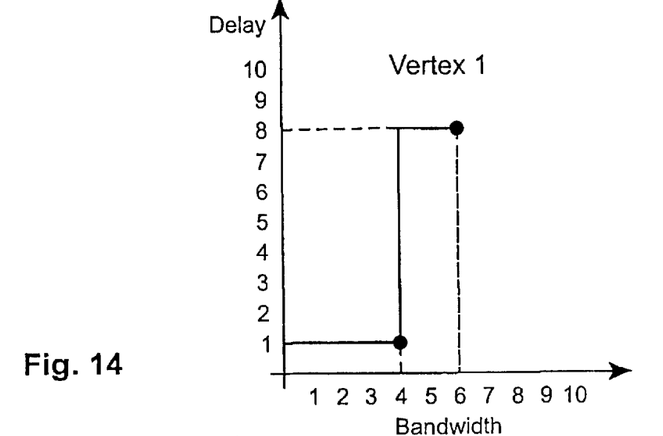
FIG. 14 is a graph illustrating the efficient frontier from node 0 of the network to node 1.
Figure 15:
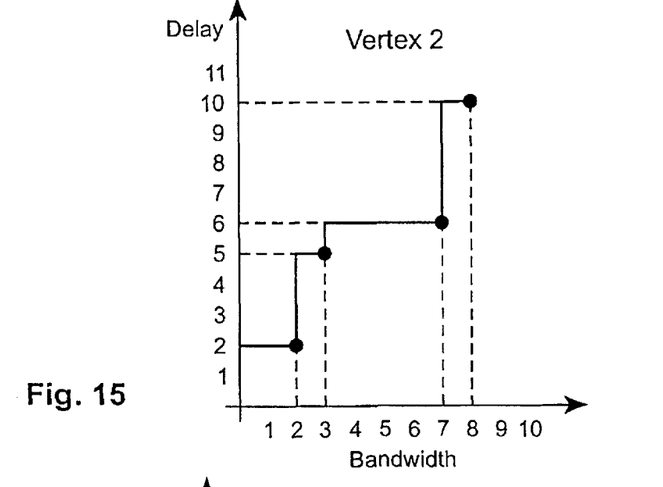
FIG. 15 is a graph illustrating the efficient frontier from node 0 of the network to node 2.
Figure 16:
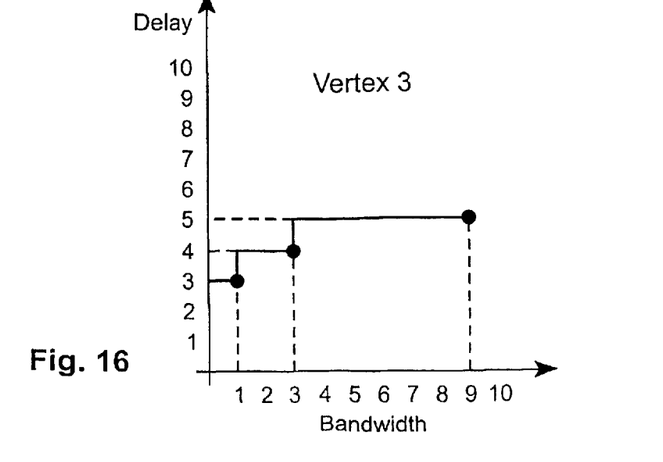
FIG. 16 is a graph illustrating the efficient frontier from node 0 of the network to node 3.

FIGS. 14 to 16 graphically illustrate the efficient frontiers from vertex 0 to vertices 1,2 and 3 respectively.

Figure 17:
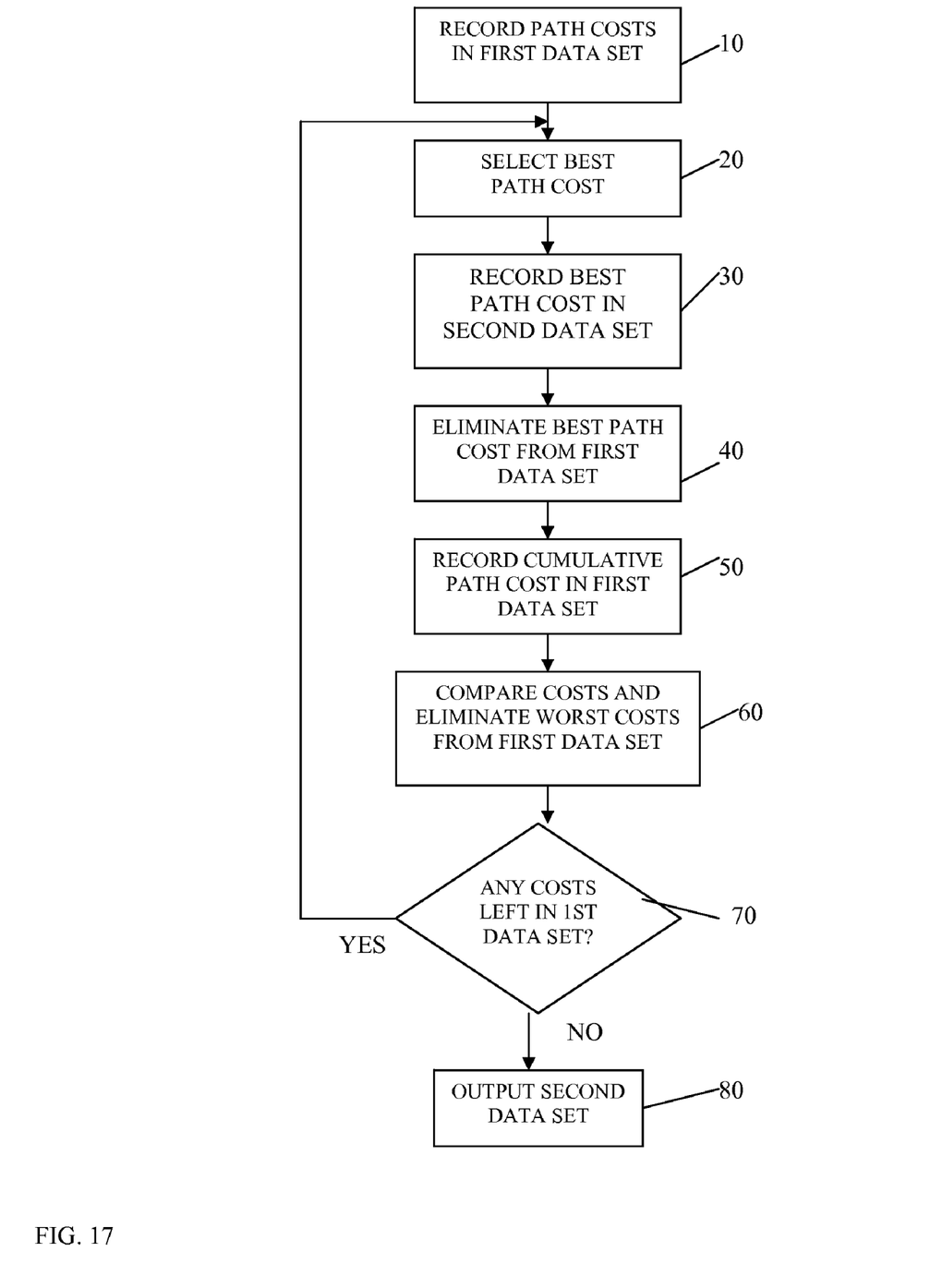
FIG. 17 is a flow chart corresponding to an example of a method for deriving a set of efficient path costs according to the present invention; and, FIG. 18 is a block diagram of a data networking device embodying the present invention.

Referring now to FIG. 17, in a preferred embodiment of the present invention, there is provided a computer program element comprising computer program code which, when loaded in a processor of a data processing system, configures the processor to perform a method for deriving a set of efficient path costs for a group of nodes comprising a source node and a plurality of destination nodes in a data communications networks, wherein the path costs for paths between nodes in the group are defined in the network and each path cost comprises a restrictive cost such as a value indicative of available bandwidth and an additive cost such as a value indicative of transit delay.

The method comprises, at step 10, recording, in a first data set in a memory of the data processing system, the path costs for direct paths from the source node to any of the destination nodes. Each recorded cost is associated in the first data set with the node reached by the corresponding path.

At step 20, the best path cost is selected from the first data set. The best path cost is determined as that comprising the best restrictive cost, or, if a plurality of the path costs comprise equal restrictive costs, the or a path cost having the best restrictive cost and the best additive cost. If for example, the restrictive cost is a value indicative of bandwidth, the best restrictive cost is the cost indicative of the maximum bandwidth. Similarly, if the additive cost is a value indicative of transit delay, the best additive cost is the cost indicative of minimum transit delay.

At step 30, the best path cost selected in step 20 is recorded in a second data set in the memory of the data processing system. The recorded cost is associated in the second data set with the node reached by the corresponding path.

At step 40, the cost recorded in step 30 in the second data set is eliminated from the first data set. The elimination may involve deletion, flagging, or any other action for excluding the cost from further consideration.

At step 50, the cumulative path costs for direct paths from the destination node reached by the path corresponding to the cost recorded in step 30 to any other node in the group are recorded in the first data set. Each recorded cumulative path cost is associated in the first data set with the node reached by the corresponding path.

At step 60, for each node for which an associated cost was recorded in first data set in step 50, the costs associated with that node in the first and second data sets are compared. Any such cost for reaching that node which has both a worse restrictive cost and a worse additive cost than any other such cost for reaching that node, or any such cost for reaching that node which has an equal restrictive and a worse additive cost than any other such cost for reaching that node, is eliminated from the first data set.

At step 70, steps 20 to 60 are repeated until no costs remain in the first data set after step 60. At step 80, the resulting second data set comprises the set of efficient costs. In other words, the set of efficient costs comprises the efficient frontiers for the source node. It will be appreciated that the data processing system may be a router, switch, bridge, brouter, hub, or any other data networking device that transmits or receives information in a communications network.

Figure 18:
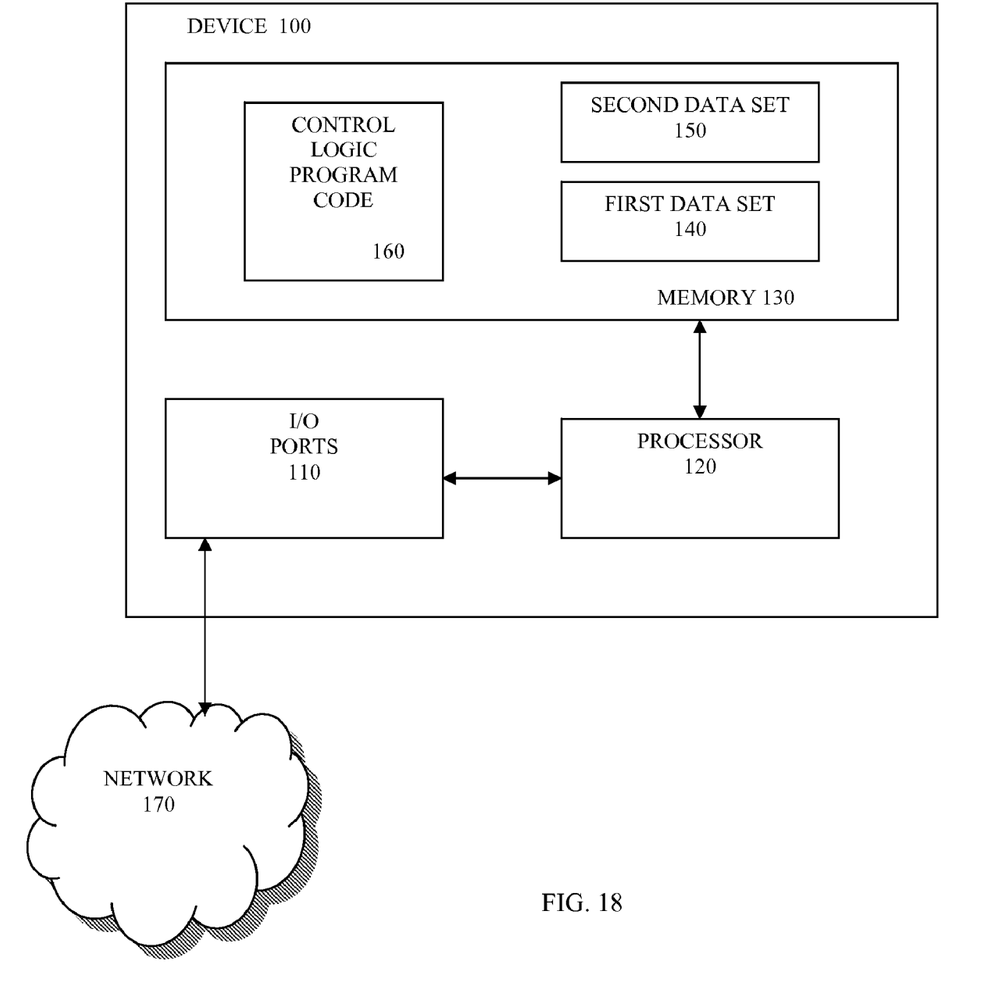

Referring now to FIG. 18, in another embodiment of the present invention, there is provided a data networking device 100 comprising input/output (I/O) ports 110 for connection to a data communications network 170, a processor 120 coupled to the I/O ports 110, and a memory 130 connected to the processor. The memory comprises space allocated to storage of a first data set 140, space allocated to storage of a second data set 150, and control logic program code 160. In operation, the data networking device derives a set of efficient path costs for a group nodes comprising a source node and a plurality of destination nodes in a data communications network. The data processing device may embody the source node of the data communications network. The path costs for paths between nodes in the group are defined in the network and each path cost comprises a restrictive cost and an additive cost. In operation, the control logic 160 configures the processor to:

a) record, in the first data set 140, the path costs for direct paths from the source node to any of the destination nodes, each recorded cost being associated in the first data set with the node reached by the corresponding path;

b) select the best path cost from the first data set 140, wherein the best path cost is determined as that comprising the best restrictive cost, or, if a plurality of the path costs comprise equal restrictive costs, the or a path cost having the best restrictive cost and the best additive cost;

c) record the best path cost selected in step b) in the second data set 150, the recorded cost being associated in the second data set 150 with the node reached by the corresponding path;

d) eliminate the cost recorded in step c) in the second data set 150 from the first data set 140;

e) in the first data set 140, record the cumulative path costs for direct paths from the destination node reached by the path corresponding to the cost recorded in step c) to any other node in the group, each recorded cumulative path cost being associated with the node reached by the corresponding path;

f) for each node for which an associated cost was recorded in first data set in step e) compare the costs associated with that node in the first data set 140 and the second data set 150 and eliminating from the first data set 140 any such cost for reaching that node which has both a worse restrictive cost and a worse additive cost than any other such cost for reaching that node or any such cost for reaching that node which has an equal restrictive and a worse additive cost than any other such cost for reaching that node; and, g) repeat steps b) to f) until no costs remain in the first data set after step f).

The resulting second data set comprises the set of efficient costs. Although, in the embodiment of the present invention hereinbefore described with reference to FIG. 18, the control logic 160 is computer program code, it will be appreciated that, in other embodiments of the present invention, the control logic may be at least partially implemented in hardwired logic circuitry. It will also be appreciated that at least one of the paths may comprise a plurality of links and at least one intermediate node.

By way of summary, in the preferred embodiments of the present invention hereinbefore described, a set of efficient path costs are derived for a group of nodes comprising a source node and a plurality of destination nodes in a data communications networks, wherein the path costs for paths between nodes in the group are defined in the network and each path cost comprises a restrictive cost and an additive cost, comprises iteratively identifying the paths of higher bandwidth first and, when two or more paths of equal bandwidth are encountered, selecting the path having a lower transit delay associated therewith.

The invention claimed is:

1. A method for deriving a set of efficient path costs to facilitate path selection for routing communications among a group of nodes comprising a source node and a plurality of destination nodes in a data communications networks, wherein the path costs for paths between nodes in the group are defined in the network and each path cost comprises a restrictive cost and an additive cost, the method comprising:

a) recording, in a first data set, the path costs for direct paths from the source node to any of the destination nodes, each recorded cost being associated in the first data set with the node reached by the corresponding path;

b) selecting a best path cost from the first data set, wherein the best path cost is determined as that comprising a best restrictive cost, or, if a plurality of the path costs comprise equal restrictive costs, a path cost having the best restrictive cost and the best additive cost;

c) recording the best path cost selected in step b) in a second data set, the recorded cost being associated in the second data set with the node reached by the corresponding path;

d) eliminating the cost recorded in step c) in the second data set from the first data set;

e) in the first data set, recording a cumulative path costs for direct paths from the destination node reached by the path corresponding to the cost recorded in step c) to any other node in the group, each recorded cumulative path cost being associated in the first data set with the node reached by the corresponding path;

f) for each node for which an associated cost was recorded in first data set in step e) comparing the costs associated with that node in the first and second data sets and eliminating from the first data set any such cost for reaching that node which has both a worse restrictive cost and a worse additive cost than any other such cost for reaching that node or any such cost for reaching that node which has an equal restrictive and a worse additive cost than any other such cost for reaching that node; and g) repeating steps b) to f) until no costs remain in the first data set after step f);

whereby the resulting second data set comprises the set of efficient costs for direct paths from the source node to destination nodes in said communications network, for use in selecting paths for routing communications in said data communications network.

2. A method as claimed in claim 1, wherein each restrictive cost comprises a value indicative of bandwidth of the corresponding path; and the best restrictive cost is the cost indicative of the maximum bandwidth.

3. A method as claimed in claim 1, wherein each additive cost comprises a value indicative of transit delay associated with the corresponding path and the best additive cost is the cost indicative of the minimum transit delay.

4. A method as claimed in claim 1, wherein at least one of the paths comprises a plurality of links and at least one intermediate node.

5. Apparatus for deriving a set of efficient path costs to facilitate path selection for a group of nodes comprising a source node and a plurality of destination nodes in a data communications networks, wherein the path costs for paths between nodes in the group are defined in the network and each path cost comprises a restrictive cost and an additive cost, the apparatus comprising memory for storing first and second data sets of the path costs and control logic configured to:
   a) record, in the first data set, the path costs for direct paths from the source node to any of the destination nodes, each recorded cost being associated in the first data set with the node reached by the corresponding path;
   b) select a best path cost from the first data set, wherein the best path cost is determined as that comprising a best restrictive cost, or, if a plurality of the path costs comprise equal restrictive costs, a path cost having the best restrictive cost and the best additive cost;
   c) record the best path cost selected in step b) in the second data set, the recorded cost being associated in the second data set with the node reached by the corresponding path;
   d) eliminate the cost recorded in step c) in the second data set from the first data set;
   e) in the first data set, record a cumulative path costs for direct paths from the destination node reached by the path corresponding to the cost recorded in step c) to any other node in the group, each recorded cumulative path cost being associated in the first data set with the node reached by the corresponding path;
   f) for each node for which an associated cost was recorded in first data set in step e) compare the costs associated with that node in the first and second data sets and eliminating from the first data set any such cost for reaching that node which has both a worse restrictive cost and a worse additive cost than any other such cost for reaching that node or any such cost for reaching that node which has an equal restrictive and a worse additive cost than any other such cost for reaching that node; and,
   g) repeat steps b) to f) until no costs remain in the first data set after step f);
   whereby the resulting second data set comprises the set of efficient costs for direct paths from the source node to destination nodes in said communications network for use in selecting paths for communications routing in said data communications network.

6. Apparatus as claimed in claim 5, wherein each restrictive cost comprises a value indicative of bandwidth of the corresponding path; and the best restrictive cost is the cost indicative of the maximum bandwidth.

7. Apparatus as claim in claim 5, wherein each additive cost comprises a value indicative of transit delay associated with the corresponding path and the best additive cost is the cost indicative of the minimum transit delay.

8. Apparatus as claimed in claim 5, wherein at least one of the paths comprises a plurality of links and at least one intermediate node.

9. A computer readable medium encoded with a computer program which, when loaded in a process of a data processing system, configures the processor to perform a method for deriving a set of efficient path costs to facilitate path selection for a group of nodes comprising a source node and a plurality of destination nodes in a data communications networks, wherein the path costs for paths between nodes in the group are defined in the network and each path cost comprises a restrictive cost and an additive cost, the method comprising:
   a) recording, in a first data set, the path costs for direct paths from the source node to any of the destination nodes, each recorded cost being associated in the first data set with the node reached by the corresponding path;
   b) selecting a best path cost from the first data set, wherein the best path cost is determined as that comprising a best restrictive cost, or, if a plurality of the path costs comprise equal restrictive costs, the or a path cost having the best restrictive cost and the best additive cost;
   c) recording the best path cost selected in step b) in a second data set, the recorded cost being associated in the second data set with the node reached by the corresponding path;
   d) eliminating the cost recorded in step c) in the second data set from the first data set;
   e) in the first data set, recording a cumulative path costs for direct paths from the destination node reached by the path corresponding to the cost recorded in step c) to any other node in the group, each recorded cumulative path cost being associated in the first data set with the node reached by the corresponding path;
   f) for each node for which an associated cost was recorded in first data set in step e) comparing the costs associated with that node in the first and second data sets and eliminating from the first data set any such cost for reaching that node which has both a worse restrictive cost and a worse additive cost than any other such cost for reaching that node or any such cost for reaching that node which has an equal restrictive and a worse additive cost than any other such cost for reaching that node; and
   g) repeating steps b) to f) until no costs remain in the first data set after step f);
   whereby the resulting second data set comprises the set of efficient costs for direct paths from the source node to destination nodes for selection of paths for communications routing in said data communications network.

* * * * *